(12) United States Patent
Suzuki

(10) Patent No.: US 6,791,535 B2
(45) Date of Patent: Sep. 14, 2004

(54) RESISTANCE FILM TYPE TOUCH PANEL WITH SHORT CIRCUIT PREVENTING STRUCTURE

(75) Inventor: Daisuke Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 293 days.

(21) Appl. No.: 09/740,820

(22) Filed: Dec. 21, 2000

(65) Prior Publication Data

US 2001/0005200 A1 Jun. 28, 2001

(30) Foreign Application Priority Data

Dec. 22, 1999 (JP) .......................................... 11-363881

(51) Int. Cl.⁷ ................................................ G09G 5/00
(52) U.S. Cl. ..................... 345/173; 345/179; 257/40; 257/59; 178/18.01; 178/18.03
(58) Field of Search .............................. 345/173, 174, 345/179, 175; 257/40, 59

(56) References Cited

U.S. PATENT DOCUMENTS

| | | | | |
|---|---|---|---|---|
| 4,672,153 A | * | 6/1987 | Kikuchi .................... | 178/18.09 |
| 4,897,511 A | * | 1/1990 | Itaya et al. .............. | 178/18.05 |
| 5,670,755 A | * | 9/1997 | Kwon ...................... | 178/18.05 |
| 6,373,474 B1 | * | 4/2002 | Katabami ................... | 345/173 |
| 6,456,279 B1 | * | 9/2002 | Kubo et al. ................ | 345/173 |
| 6,476,798 B1 | * | 11/2002 | Bertram et al. ............. | 345/174 |
| 6,483,498 B1 | * | 11/2002 | Colgan et al. ............. | 345/173 |
| 6,611,258 B1 | * | 8/2003 | Tanaka et al. .............. | 345/179 |
| 6,664,950 B1 | * | 12/2003 | Blanchard ................... | 345/173 |

FOREIGN PATENT DOCUMENTS

| | | |
|---|---|---|
| JP | 4-100140 | 2/1992 |
| JP | 6-175769 | 6/1994 |
| JP | 2928190 | 5/1999 |
| JP | 11-243263 | 9/1999 |
| JP | 11-286066 | 10/1999 |

* cited by examiner

Primary Examiner—Richard Hjerpe
Assistant Examiner—Kimnhung Nguyen
(74) Attorney, Agent, or Firm—Whitham, Curtis & Christofferson, P.C.

(57) ABSTRACT

A resistance film type touch panel includes first and second substrates opposing to each other, and respectively having panel planes. A first electrode film is formed in a central portion of the panel plane of the first substrate on a lower surface of the first substrate, and a second electrode film is formed in a central portion of the panel plane of the second substrate on an upper surface of the second substrate. First and second electrodes are connected to the first electrode film and are formed to oppose to each other around the first electrode film on the lower surface of the first substrate. Third and fourth electrodes are connected to the second electrode film and are formed to oppose to each other around the second electrode film on the upper surface of the second substrate orthogonally to the first and second electrodes. First to fourth wiring lines connect the first to fourth electrodes to connection terminals, respectively. An insulating resin film is formed to cover the first and second wiring lines.

23 Claims, 4 Drawing Sheets

RESISTANCE FILM TYPE TOUCH PANEL WITH SHORT CIRCUIT PREVENTING STRUCTURE

BACKGROUND OF THE INVENTION

1. Field of the Invention

The present invention relates to a resistance film type touch panel, and more particularly to a short circuit preventing structure between electrodes in a resistance film type touch panel.

2. Description of the Related Art

A resistance film type touch panel is known in which data is outputted by touching a position on a 2-dimensional coordinates system of the panel. In the touch panel, when the position on the touch panel is touched, an electrode film on an upper side touches an electrode film on a lower side so that an electrically conductive path is formed between the electrode films. The position of the electrically conductive path corresponds to the 2-dimensional coordinates position touched.

FIG. 1 shows a sectional view of the electrode structure on the upper side in the touch panel. A PET layer 102 is formed of PET as a base layer of the upper electrode side. The upper surface of the PET layer 102 is covered by a hard coat layer 101. An anchor layer is formed on the lower surface of the PET layer 102. A transparent electrode film 103 is formed on the anchor layer to oppose to a lower electrode structure. The transparent electrode film 103 in the upper electrode structure is connected with a wiring line 104 in the upper electrode structure through an electric wiring line (not shown). A wiring line 105 in the lower electrode structure is connected with an electrode film (not shown) in the lower electrode structure, and is separated from the wiring line 104 in the upper electrode structure by insulation adhesive 106. Also, the transparent electrode film 103 and the wiring line 104 in the upper electrode structure are separated from the wiring line 105 in the lower electrode structure by a transparent insulation cover resin layer 107.

The PET layer 102 and the transparent insulation cover resin layer 107 have moisture absorption property. An interface between the PET layer 102 and the transparent insulation cover resin layer 107 and between the wiring line 104 in the upper electrode structure and the wiring line 105 in the lower electrode structure tend to collect a water component. When there is ionized material near the interface, the water component changes into electrolysis solution so that there is a possibility that the wiring line 104 in the upper electrode structure and the wiring line 105 in the lower electrode structure form a short circuit. Also, when the wiring line 104 in the upper electrode structure and the wiring line 105 in the lower electrode structure are formed of silver paste, the silver paste dissolves in the water component so that ion migration sometimes occurs.

In conjunction with the above description, a wiring line substrate is disclosed in Japanese Laid Open Patent Application (JP-A-Heisei 11-243263). In this reference, a plurality of wiring lines (14) are provided on a base substrate (11) via an adhesive layer (12). That is, the adhesive layer (12) is removed in any region other than the plurality of wiring lines (14). Thus, the adhesive layer (12) which causes ion migration to the surface of the base substrate (11) does not exist between the adjacent wiring lines (14). Therefore, even if a voltage is applied to the wiring line (14), the ion migration never occurs. That is, a short circuit can be prevented between the wiring lines (14).

Also, a taping lead frame is disclosed in Japanese Patent No. 2,928,190. In this reference, an insulating tape is adhered by an adhesive layer to leads of a lead frame which is used for seal of a semiconductor chip. In the taping lead frame having such a structure, a thick portion of the adhesive layer is formed at a position in contact with the lead. The thickness of the thick portion is twice of that of the adhesive layer at a center portion between the leads.

SUMMARY OF THE INVENTION

Therefore, an object of the prevent invention is to provide a short circuit preventing structure between electrodes in a resistance film type touch panel, in which a short circuit between both of the electrodes due to moisture can be reliably prevented.

Another object of the present invention is to provide a short circuit preventing structure between electrodes in a resistance film type touch panel, in which dissolving of electrode forming material into moisture and ion migration can be reliably prevented.

In order to achieve an aspect of the present invention, a resistance film type touch panel includes first and second substrates opposing to each other, and respectively having panel planes. A first electrode film is formed in a central portion of the panel plane of the first substrate on a lower surface of the first substrate, and a second electrode film is formed in a central portion of the panel plane of the second substrate on an upper surface of the second substrate. First and second electrodes are connected to the first electrode film and are formed to oppose to each other around the first electrode film on the lower surface of the first substrate. Third and fourth electrodes are connected to the second electrode film and are formed to oppose to each other around the second electrode film on the upper surface of the second substrate orthogonally to the first and second electrodes. First to fourth wiring lines connect the first to fourth electrodes to connection terminals, respectively. An insulating resin film is formed to cover the first and second wiring lines.

Here, each of the first and second wiring lines may be provided to have distances from edges of the first substrate. In this case, the insulating resin film may extend to the edges of the first substrate to cover the first and second wiring lines.

Also, the insulating resin film may be formed to cover the first and second electrodes in addition to the first and second wiring lines. In this case, the insulating resin film may be formed to cover a peripheral portion of the first electrode film in addition to the first and second electrodes.

Also, the fourth electrode may be formed on a lower surface of the insulating resin film directly beneath the first wiring line. Alternatively, the fourth electrode may be formed on a lower surface of the insulating resin film between the first wiring line and an end of the first electrode film.

Also, the first substrate may include a PET layer and an anchor film formed on a lower surface of the PET layer.

Also, the insulating resin film may be transparent.

In order to achieve another aspect of the present invention, a resistance film type touch panel includes first and second substrates opposing to each other, and respectively having panel planes. A first electrode film is formed in a central portion of the panel plane of the first substrate on a lower surface of the first substrate, and a second electrode film is formed in a central portion of the panel plane of the second substrate on an upper surface of the second substrate. First and second electrodes are connected to the first electrode film and are formed to oppose to each other around the first electrode film on the lower surface of the first substrate, and third and fourth electrodes are connected to the second electrode film and formed to oppose to each other around the second electrode film on the upper surface of the second substrate orthogonally to the first and second electrodes. First to fourth wiring lines connect the first to fourth electrodes to connection terminals, respectively. An insulating resin film is formed to cover the first and second electrodes and the first and second wiring lines.

Here, each of the first and second wiring lines may be provided to have distances from edges of the first substrate. In this case, the insulating resin film may extend to the edges of the first substrate to cover the first and second wiring lines.

Also, the insulating resin film may be formed to cover a peripheral portion of the first electrode film in addition to the first and second electrodes.

Also, the fourth electrode may be formed on a lower surface of the insulating resin film directly beneath of the first wiring line. Alternatively, the fourth electrode may be formed on a lower surface of the insulating resin film between the first wiring line and an end of the first electrode film.

Also, the first substrate may include a PET layer and an anchor film formed on a lower surface of the PET layer.

Also, the insulating resin film may be transparent.

DESCRIPTION OF THE PREFERRED EMBODIMENTS

Hereinafter, the resistance film type touch panel of the present invention will be described below with reference to the attached drawings.

Figure 1:
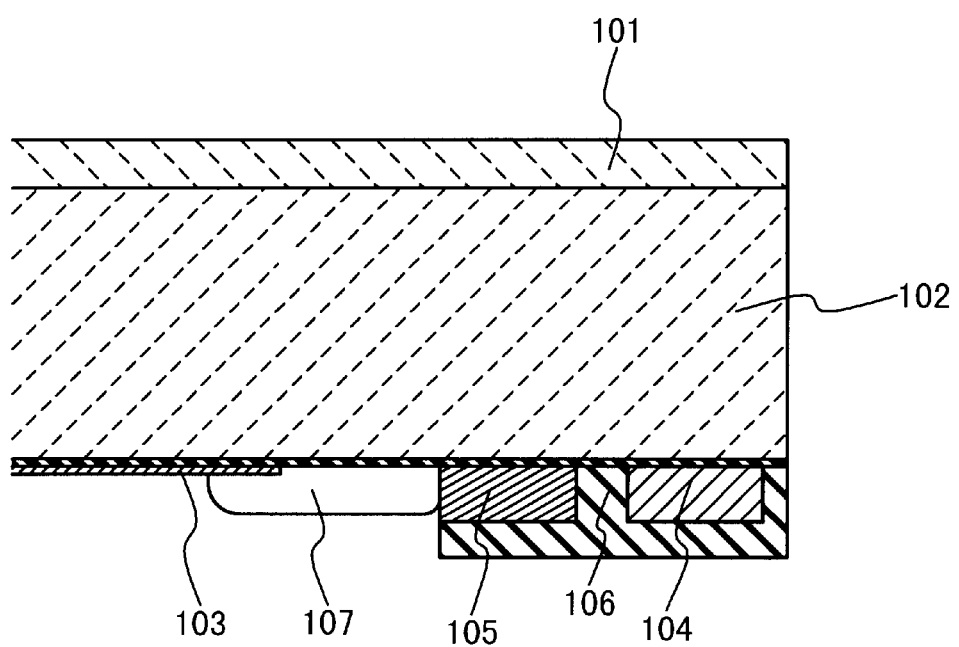
FIG. 1 is a sectional view showing a conventional resistance film type touch panel.
Figure 2:
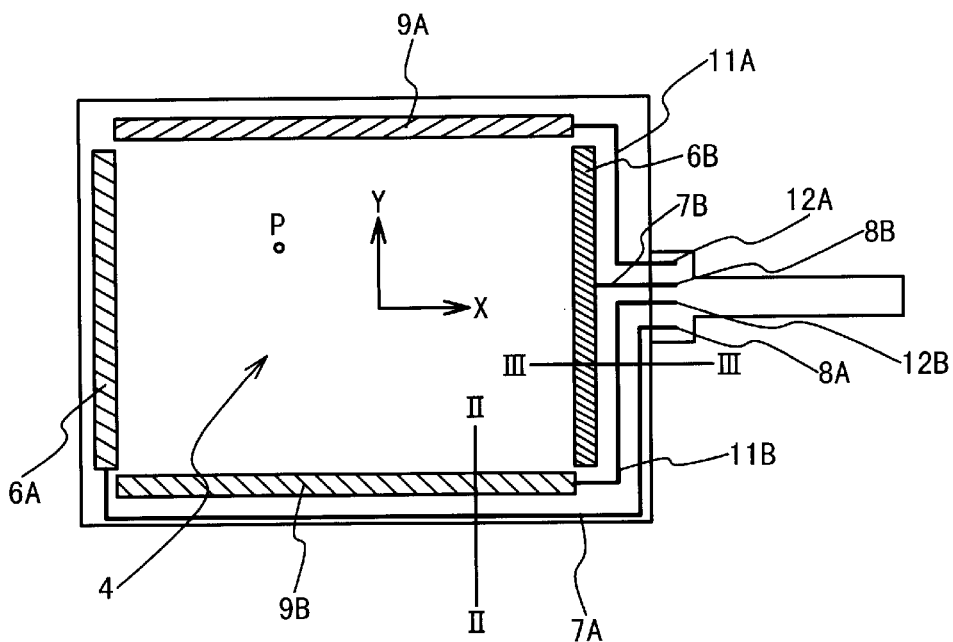
FIG. 2 is a plan view showing a resistance film type touch panel of the present invention.
Figure 3:
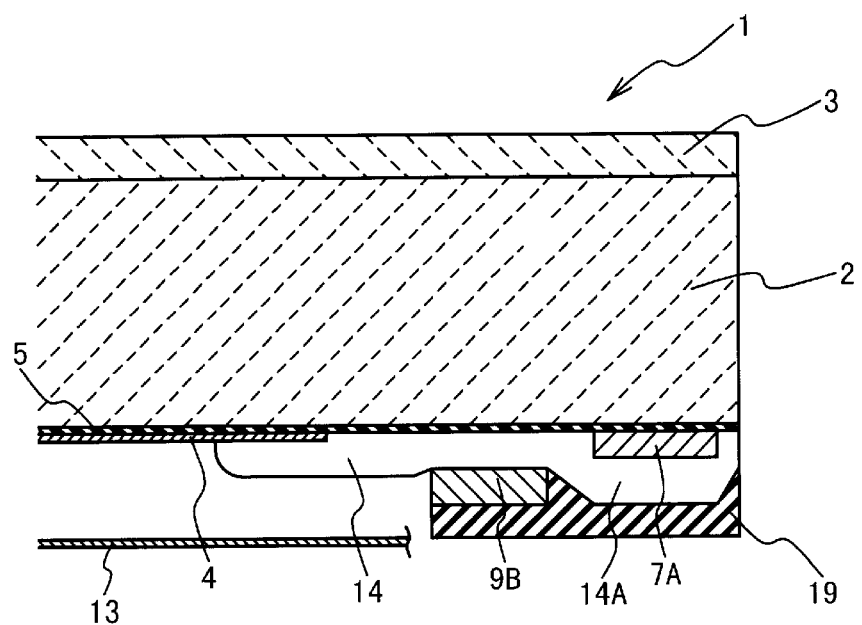
FIG. 3 is a sectional view along the II—II line of FIG. 2 of the resistance film type touch panel according to a first embodiment of the present invention.
Figure 4:
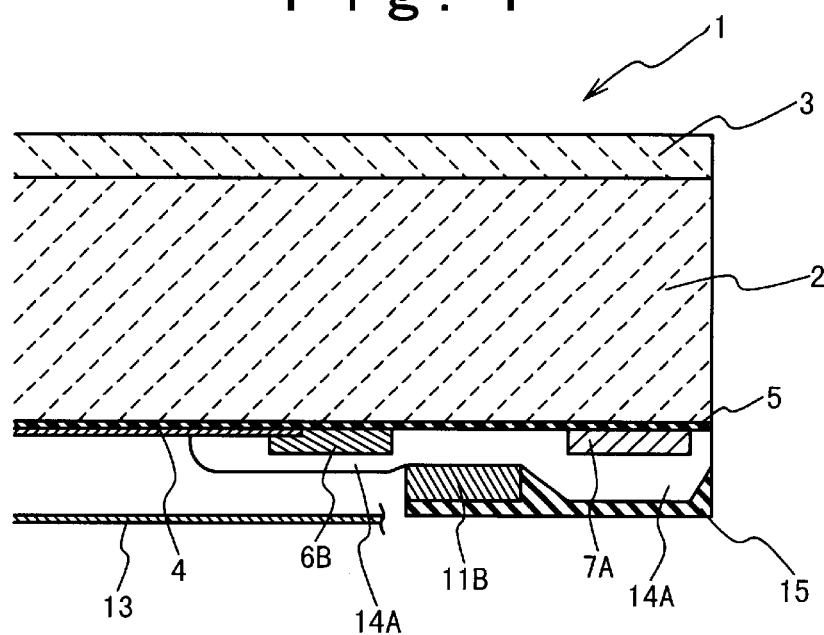
FIG. 4 is a sectional view of the III—III line of FIG. 2 of the resistance film type touch panel according to the first embodiment of the present invention.

FIG. 2 is a plan view showing the resistance film type touch panel of the present invention. FIG. 3 is a sectional view along the II—II line of FIG. 2 of the resistance film type touch panel according to a first embodiment of the present invention. FIG. 4 is a sectional view of the III—III line of FIG. 2 of the resistance film type touch panel according to the first embodiment of the present invention.

Referring to FIG. 3, an upper electrode structure 1 is composed of a PET layer 2 formed of PET as base material. A hard coat layer 3 is formed on the upper surface of the PET layer 2. An anchor coat layer 5 is often formed on the lower surface of the PET layer 2. A transparent electrode film 4 in the upper electrode structure 1 is formed on the anchor coat layer to oppose to a lower electrode structure in a central rectangular region surrounded by four peripheral portions. The anchor coat layer 5 is formed of fitting material to improve the fitness of the transparent electrode film 4 to the PET layer 2. Therefore, the anchor coat layer 5 may be omitted. The transparent electrode film 4 in the upper electrode structure does not exist in the four peripheral portions and their neighborhood portion.

Referring to FIG. 3, electrodes 6A and 6B in the upper electrode structure are formed under the PET layer 2 in parallel in two of the four peripheral portions such that the electrodes 6A and 6B extend in the direction of the Y axis. The both ends of the transparent electrode film 4 in the direction of the X axis are connected to the electrodes 6A and 6B, respectively. The electrodes 6A and 6B are connected to connection terminals 8A and 8B for an external unit via wiring lines 7A and 7B. A transparent insulation resin cover 14 covers the peripheral ends of the transparent electrode film 4. The transparent insulation resin cover film 14 extends to the ends of the touch panel 1 to cover the wiring line 7A in FIG. 3 and the electrode 6B and the wiring line 7A in FIG. 4, respectively.

Referring to FIG. 4, electrodes 9A and 9B are formed on the lower surface of the transparent insulation resin cover film 14 in parallel in remaining two of the four peripheral portions. The electrodes 9A and 9B extend in the direction of the X axis as a part of the upper electrode structure. A lower electrode film 13 is provided on a lower substrate (not shown) in a central rectangular region of the touch panel in the lower electrode structure in correspondence to the transparent electrode film 4. The lower electrode film 13 is separated from the transparent electrode film 4 in the upper electrode structure with a proper space (about 50 μm). The both ends of the lower electrode film 13 in the direction of the Y axis are connected to the electrodes 9A and 9B by silver paste, respectively. The electrodes 9A and 9B are connected to connection terminals 12A and 12B for the external unit via wiring lines 11A and 11B. The electrodes 9A and 9B and the wiring lines 11A and 11B are formed on and coupled to the lower surface of the transparent insulation resin cover film 14 by insulation adhesive 15.

The wiring lines 7A and 7B and the wiring lines 11A and 11B are formed of silver paste by use of print technique in this embodiment. Also, the electrode 9B is formed between the transparent electrode film 4 and the wiring line 7A in the direction of Y axis and the wiring line 11B is formed between the electrode 6B and the wiring line 7A in the direction of Y axis The transparent insulation resin cover 14 with such a structure prevents contact of the transparent electrode film 4 in the upper electrode structure and the lower electrode film 13 due to the warp of the peripheral portion or the bend of the edge of the housing generated when the hard coat layer 3 is pressed in the peripheral portion of the rectangular region. Also, the extending section 14A of the transparent insulation resin cover 14 can prevent contact of the wiring line 7A and the electrode on the lower electrode 9B, contact of the electrode 6B and the wiring line 11B, and contact of the wiring line 7A and the wiring line 11B.

When the transparent electrode film 4 in the rectangular region of the upper electrode structure and the lower electrode film 13 in the rectangular region are in contact with each other by pressing a position P of FIG. 2 with a finger, current flows from the electrode 6B in the upper electrode structure to the lower electrode 9A or 9B through the position P. At this time, the current value is dependent on the resistance value of the transparent electrode film 4 corresponding to the effective distance from the electrode 6B to the lower electrode 9A or 9B through the position P. The current is outputted from the connection terminal 12A or 12B. The coordinates position of the point P on the X-Y coordinate system can be determined based on the current value.

Water components are generated in an interface between the PET layer 2 and the transparent electrode film 4 or between the anchor coat 5 and the transparent electrode film 4 shown by arrows D in FIGS. 3 and 4 under high moisture environment. The water components dissolve ionization material in the neighborhood and becomes electrolysis solution. However, the electrolyte solution is blocked off by the transparent insulation resin cover film 14 and its extending section 14A. Therefore, any short circuit is not formed between the transparent electrode film 4 in the upper electrode structure and the lower electrode film 13, between the wiring line 7A and the electrode 9B, and between the electrode 6B and the wiring line 11B, resulting in reliable prevention of the above-mentioned contact.

Also, the formation of a short circuit due to the ion migration can be effectively prevented even if the silver paste of the electrode 6B and the wiring line 7A are dissolved into the water components. In this way, the transparent insulation resin cover film 14 can structurally prevent electric contact through dynamic transformation and the formation of the short circuit by moisture.

Next, the resistance film type touch panel according to the second embodiment of the present invention will be described below with reference to FIGS. 5 and 6.

Figure 5:
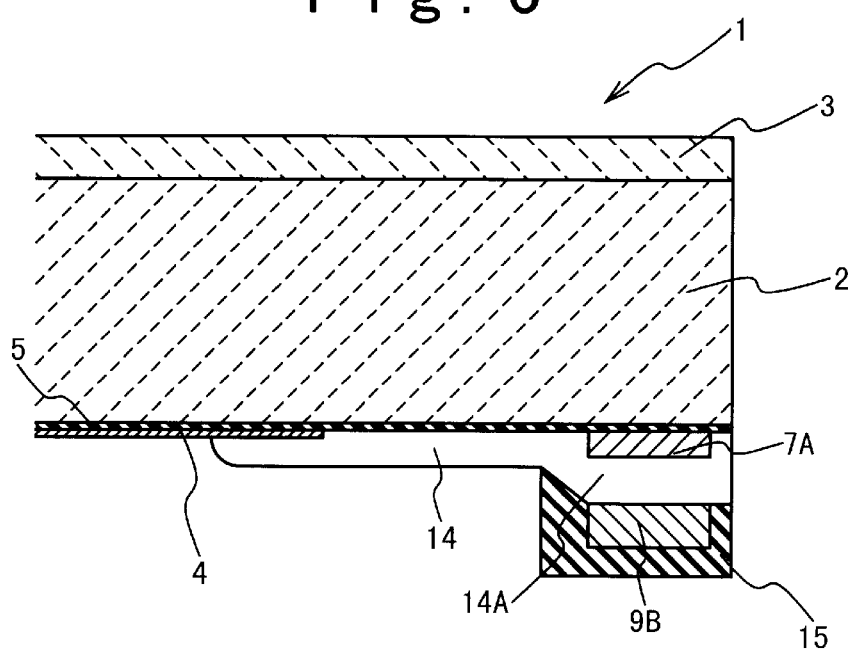
FIG. 5 is a sectional view along the II—II line of FIG. 2 of the resistance film type touch panel according to a second embodiment of the present invention.
Figure 6:
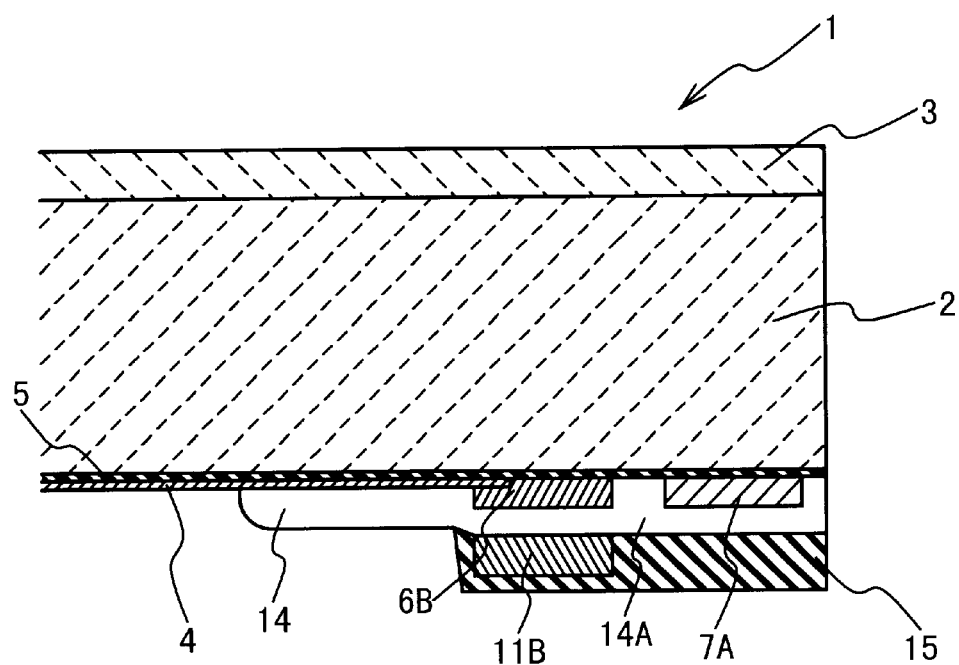
FIG. 6 is a sectional view of the III—III line of FIG. 2 of the resistance film type touch panel according to the second embodiment of the present invention.

As shown in FIGS. 5 and 6, the wiring line 9B is provided directly beneath the wiring line 7A. Also, the wiring line 11B is formed directly beneath the electrode 6B. In this way, such a structure can make the area of the whole upper electrode structure 1 small.

In the previously mentioned embodiments, the wiring lines 7A, 7B, 11A and 11B are formed in the upper electrode structure. However, the wiring lines 7A, 7B, 11A and 11B may be formed in a lower electrode structure.

As described above, according to the short circuit preventing structure of the resistance film type touch panel of the present invention, a reliable spacing structured is provided around the 2-dimensional electrode films. Therefore, the short circuit between the wiring lines can be prevented.

What is claimed is:

1. A resistance film type touch panel comprising:
    first and second substrates opposing each other, and respectively having panel planes;
    a first electrode film formed in a central portion of said panel plane of said first substrate on a lower surface of said first substrate;
    a second electrode film formed in a central portion of said panel plane of said second substrate on an upper surface of said second substrate;
    first and second electrodes connected to said first electrode film and formed to oppose each other around said first electrode film on the lower surface of said first substrate;
    third and fourth electrodes connected to said second electrode film and formed to oppose each other around said second electrode film on the upper surface of said second substrate orthogonally to said first and second electrodes;
    first to fourth wiring lines respectively connecting said first to fourth electrodes to connection terminals;
    an insulating resin film formed to cover said first and second wiring lines, said insulating resin film (14) preventing the first electrode film (4) from contacting the second electrode film (13).

2. The resistance film type touch panel according to claim 1, wherein each of said first and second wiring lines is provided to have distances from edges of said first substrate.

3. The resistance film type touch panel according to claim 2, wherein said insulating resin film extends to said edges of said first substrate to cover said first and second wiring lines.

4. The resistance film type touch panel according to claim 1, wherein said insulating resin film is formed to cover said first and second electrodes in addition to said first and second wiring lines.

5. The resistance film type touch panel according to claim 4, wherein said insulating resin film is formed to cover a peripheral portion of said first electrode film in addition to said first and second electrodes.

6. The resistance film type touch panel according to claim 1, wherein said fourth electrode is formed on a lower surface of said insulating resin film directly beneath said first wiring line.

7. The resistance film type touch panel according to claim 1, wherein said fourth electrode is formed on a lower surface of said insulating resin film between said first wiring line and an end of said first electrode film.

8. The resistance film type touch panel according to claim 1, wherein said first substrate includes a PET layer and an anchor film formed on a lower surface of said PET layer.

9. The resistance film type touch panel according to claim 1, wherein said insulating resin film is transparent.

10. A resistance film type touch panel comprising:
    first and second substrates opposing each other, and respectively having panel planes;
    a first electrode film formed in a central portion of said panel plane of said first substrate on a lower surface of said first substrate;
    a second electrode film formed in a central portion of said panel plane of said second substrate on an upper surface of said second substrate;
    first and second electrodes connected to said first electrode film and formed to oppose each other around said first electrode film on the lower surface of said first substrate;
    third and fourth electrodes connected to said second electrode film and formed to oppose each other around said second electrode film on the upper surface of said second substrate orthogonally to said first and second electrodes;
    first to fourth wiring lines respectively connecting said first to fourth electrodes to connection terminals;
    an insulating resin film formed to cover said first and second electrodes and said first and second wiring lines, said insulating resin film preventing the first electrode film from contacting the second electrode film.

11. The resistance film type touch panel according to claim 10, wherein each of said first and second wiring lines is provided to have distances from edges of said first substrate.

12. The resistance film type touch panel according to claim 11, wherein said insulating resin film extends to said edges of said first substrate to cover said first and second wiring lines.

13. The resistance film type touch panel according to claim 10, wherein said insulating resin film is formed to cover a peripheral portion of said first electrode film in addition to said first and second electrodes.

14. The resistance film type touch panel according to claim 10, wherein said fourth electrode is formed on a lower surface of said insulating resin film directly beneath said first wiring line.

15. The resistance film type touch panel according to claim 10, wherein said fourth electrode is formed on a lower surface of said insulating resin film between said first wiring line and an end of said first electrode film.

16. The resistance film type touch panel according to claim 10, wherein said first substrate includes a PET layer and an anchor film formed on a lower surface of said PET layer.

17. The resistance film type touch panel according to claim 10, wherein said insulating resin film is transparent.

18. A resistance film type touch panel comprising:
  a first electrode film formed in a central portion of a first panel plane;
  a second electrode film formed in a central portion of a second panel plane;
  first and second electrodes connected to said first electrode film and opposing each other around said first electrode film;
  third and fourth electrodes connected to said second electrode film and opposing each other around said second electrode film orthogonally to said first and second electrodes;
  first to fourth wiring lines respectively connecting said first to fourth electrodes to connection terminals;
  an insulating resin film covering said first and second wiring lines, and optionally covering said first and second electrodes, said insulating resin film preventing the first electrode film from contacting the second electrode film.

19. The resistance film type touch panel of claim 18, wherein the first and second panel planes are included in respective first and second substrates opposing each other.

20. The resistance film type touch panel of claim 18, wherein the insulating resin film covers the first and second electrodes.

21. An insulating resin film structure in a resistance film type touch panel, comprising:
  an insulating resin film covering at least first and second wiring lines, and optionally covering first and second electrodes, wherein:
    (i) the resistance film type touch panel includes first to fourth wiring lines respectively connecting first to fourth electrodes to connection terminals;
    (ii) the first and second electrodes are connected to a first electrode film and oppose each other around said first electrode film, wherein said insulating resin film prevents the first electrode film from contacting a second electrode film.

22. An insulating resin film structure according to claim 21, wherein the third and fourth electrodes are connected to a second electrode film and oppose each other around said second electrode film orthogonally to said first and second electrodes.

23. An insulating resin film structure according to claim 22, wherein the first electrode film is formed in a central portion of a first panel plane in a first substrate, and the second electrode film is formed in a central portion of a second panel plane in a second substrate.

* * * * *